(12) United States Patent
Wagner

(10) Patent No.: US 10,822,248 B1
(45) Date of Patent: Nov. 3, 2020

(54) WATER FILTRATION DEVICE AND METHOD FOR RE-CIRCULATING FILTERED WATER IN DECORATIVE WATERWAYS

(71) Applicant: Steven James Wagner, Whitehall, MT (US)

(72) Inventor: Steven James Wagner, Whitehall, MT (US)

( * ) Notice: Subject to any disclaimer, the term of this patent is extended or adjusted under 35 U.S.C. 154(b) by 0 days.

(21) Appl. No.: 16/908,212

(22) Filed: Jun. 22, 2020

(51) Int. Cl.
| | |
|---|---|
| *B01D 24/16* | (2006.01) |
| *A01K 63/04* | (2006.01) |
| *E02B 5/08* | (2006.01) |
| *C02F 1/00* | (2006.01) |
| *B05B 17/08* | (2006.01) |
| *B01D 24/26* | (2006.01) |
| *C02F 3/06* | (2006.01) |

(52) U.S. Cl.
CPC .............. *C02F 1/001* (2013.01); *A01K 63/04* (2013.01); *B01D 24/165* (2013.01); *B01D 24/263* (2013.01); *B05B 17/08* (2013.01); *C02F 3/06* (2013.01); *E02B 5/08* (2013.01); *C02F 2201/004* (2013.01); *C02F 2201/006* (2013.01); *C02F 2303/16* (2013.01)

(58) Field of Classification Search
CPC .... B01D 24/165; B01D 24/263; B01D 35/02; C02F 3/06; C02F 2201/006; E02B 5/00; E02B 5/08; A01K 63/04; A01K 63/045
USPC ....... 210/617, 747.5, 805, 807, 150, 167.01, 210/167.13, 167.22, 167.25, 170.02, 210/170.09, 170.1, 238, 282, 287; 119/226, 227, 259, 260
See application file for complete search history.

(56) References Cited

U.S. PATENT DOCUMENTS

| | | | |
|---|---|---|---|
| 3,957,017 A * | 5/1976 | Carmignani | A01K 63/04 119/227 |
| 5,116,489 A * | 5/1992 | Englert | A01K 63/045 119/260 |
| 5,427,679 A | 6/1995 | Daniels | |
| 5,584,991 A * | 12/1996 | Wittstock | A01K 63/045 119/227 |
| 6,054,045 A | 4/2000 | Wittstock et al. | |
| 6,241,877 B1 | 6/2001 | Berkey | |
| 6,290,844 B1 | 9/2001 | Tennyson, Jr. | |

(Continued)

*Primary Examiner* — Christopher Upton
(74) *Attorney, Agent, or Firm* — MacBride Law, PLLC; William L. MacBride, Jr.

(57) ABSTRACT

A water filtration device comprising a drum housing a removable canister containing a replaceable water filter media. A pair of lifting handle/media stops, connected to the removable canister, pivotally secure the replaceable water filter media, enabling a user to lift the removable canister from the drum and remove the replaceable water filter media. The drum is located along and connected to a water circulating line comprising a water supply line and a water discharge line. Unfiltered water is circulated into the water filtration device, creating the filtered water circulating into the water discharge line to the decorative water feature thereby re-circulating the unfiltered water from the water filtration device as filtered water back through a decorative water feature to a water feature terminus. As unfiltered water is pumped from the water feature terminus, it again passes through the replaceable water filter media.

20 Claims, 7 Drawing Sheets

(56) References Cited

U.S. PATENT DOCUMENTS

| | | | |
|---|---|---|---|
| 6,461,501 B1 * | 10/2002 | Porter | A01K 63/04 210/170.02 |
| 6,602,408 B1 * | 8/2003 | Berkey | B01D 35/027 210/170.09 |
| 6,709,580 B2 * | 3/2004 | Ouwinga | A01K 63/04 210/170.02 |
| 6,740,232 B1 * | 5/2004 | Beaulieu | C02F 3/24 210/170.02 |
| 6,793,813 B1 | 9/2004 | Etheridge et al. | |
| 6,896,798 B2 | 5/2005 | Dover | |
| 6,893,573 B2 | 6/2005 | Dover et al. | |
| 7,425,268 B2 * | 9/2008 | Russell | C02F 3/06 210/150 |
| 7,731,841 B1 * | 6/2010 | Tennyson, Jr. | C02F 3/06 210/170.09 |
| 8,961,782 B2 | 2/2015 | Berkey | |
| 2004/0060853 A1 | 4/2004 | Dover | |
| 2013/0213867 A1 * | 8/2013 | Agresta | A01K 63/045 210/167.25 |

* cited by examiner

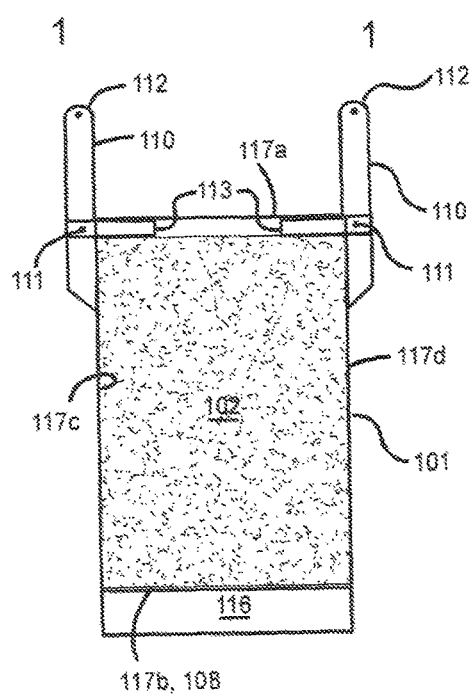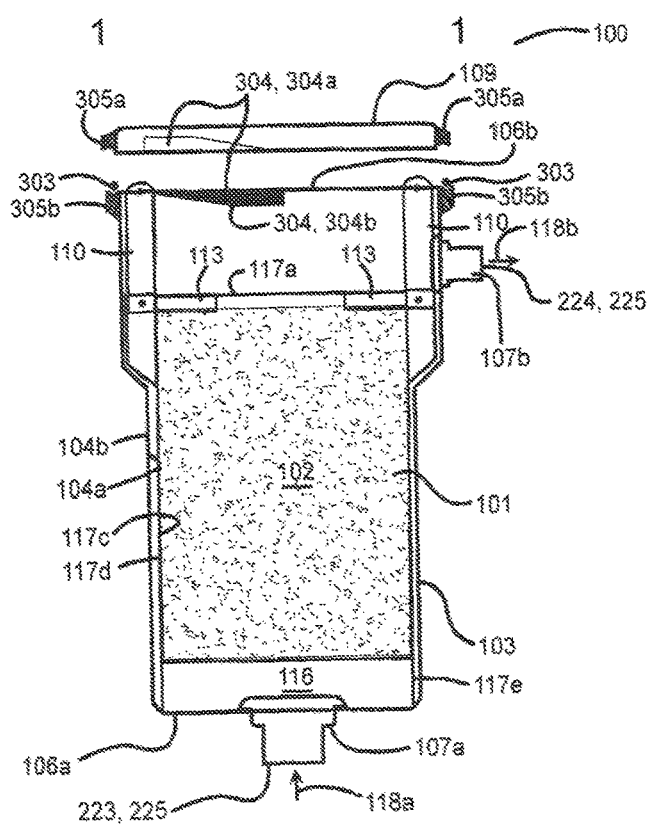
FIG. 2
FIG. 3

WATER FILTRATION DEVICE AND METHOD FOR RE-CIRCULATING FILTERED WATER IN DECORATIVE WATERWAYS

FIELD OF THE INVENTION

This application relates to water filtration devices and methods for re-circulating filtered water into decorative waterways for the landscape industry where decorative water gardens are designed and built and/or serviced by the landscape maintenance industry.

BACKGROUND OF THE INVENTION

Water filtration devices and methods for circulating and re-circulating water are historically well known. There has been a recognized need, particularly by those who are employed in maintaining water garden landscaping, for providing the removal of visible impurities to improve water clarity in decorative water gardens and ponds. As well, there is a recognized need for such water filtration devices and system to be easily serviced and easily concealed within the gardens or decorative waterway.

There are various filtering devices and methods for decorative waterways and ponds disposing a filter between the pump and the water feature described in the related art, but none disclose all the features of the present invention and would not be as suitable for the required purpose as set for the manner of the present invention hereinafter described, such as U.S. Pat. No. 6,896,798 to Dover ("Dover") and U.S. Pat. No. 6,893,573 to Dover et al. ("Dover et al"). Dover discloses a pond filter with a collapsible filter bag and Dover et al discloses a pond filter with back flush cleaning U.S. Pat. No. 6,793,813 to Etheridge et al. ("Etheridge") discloses a sealed filtration system with pump and layered filter media, requiring three chambers. None of these references, nor any other references to related art, disclose all of the features of the present invention, which includes a drum containing a filter canister with locking and lifting handles.

U.S. Pat. No. 6,241,877 to Berkey discloses a pair of handles to lift a filter canister for purposes of cleaning Neither this reference alone, nor in combination with any other references, teaches or suggests the present invention. In particular, nothing in the disclosures of Berkey suggest or teach the foldable or pivoting handles of the present invention. As well, there is no apparent advantage in Berkey for doing so. The handles of the present invention have a dual purpose, combining with arched or u-shaped arms that hold water filter media in place during use.

None of the references in the related art contain every feature of the present invention, and none of these references in combination disclose, suggest or teach every feature of the present invention.

The foregoing and other objectives, advantages, aspects, and features of the present invention will be more fully understood and appreciated by those skilled in the art upon consideration of the detailed description of a preferred embodiment, presented below in conjunction with the accompanying drawings.

SUMMARY OF THE INVENTION

The present invention is an in-line, high volume filtration device for decorative ponds in the landscaping industry. One embodiment of the present invention is a water filtration device comprising a removable canister containing a replaceable water filter media and a drum housing the removable canister. An unfiltered water inlet extends through and into the drum proximal to the drum bottom. A filtered water outlet extends through and out of the drum proximal to the opposing drum top. The opposing canister bottom to the removable canister comprises an interior perforated floor disposed proximal to the opposing drum bottom and above the unfiltered water inlet when the removable canister is housed within the drum. Replaceable water filter media is housed or contained within the removable canister. The drum further comprises an inlet connection connected externally to the unfiltered water inlet, and an outlet connection connected externally to the filtered water outlet. Each of the inlet connection and the outlet connection to connect respectively to a water circulating line. The unfiltered water inlet is configured to allow unfiltered water to enter the drum through the unfiltered water inlet. The filtered water outlet is configured to allow filtered water to exit the drum through the filtered water outlet.

A pair of lifting handle/media stops are connected to the opposing canister exterior side of the removable canister by a pair of pivot points located proximal to the canister top and engage in locking positions in the water filtration device to secure the replaceable water filter media. The pair of lifting handle/media stops have a handle locked position and a handle unlocked position operating to secure and release the replaceable water filter media. Each of the pair of lifting handles to the pair of lifting handle/media stops extend upward, respectively from the pair of opposing pivot points when the pair of lifting handle/media stops are in the handle locked position and above the canister top enabling a user to lift the removable canister from the drum when the removable and secure lid is removed from the drum and hinge downward along the opposing exterior side of the drum when in the handle unlocked position allowing the cooperating filter media stop to pivot outward from the removable canister, allowing the user to remove the replaceable water filter media from the removable canister. Each of the pair of lifting handles to the pair of lifting handle/media stops re-extend upward, respectively from the opposing pair of pivot points when the pair of lifting handle/media stops are returned to the handle locked position whereby the user operating the water filtration device replaces the replaceable water filter media into the removable canister while the pair of lifting handle/media stops are in the handle unlocked position, and pivot the pair of lifting handle/media stops into the handle locked position and reinsert the removable canister into the drum.

The removable canister consists of an interior perforated floor. The drum has an inlet in the center of its bottom, and the unfiltered water inlet centrally located within and through the drum bottom, and an outlet on the side which is the filtered water outlet. A water by-pass valve is installed at the filtered water outlet, whereby the filtered water outlet allows any of the unfiltered water remaining in the removable canister to be discharged through a by-pass pipe connected to the water by-pass valve to a dumping point.

The drum is located along a water circulating line comprising a water supply line connected to the drum at the unfiltered water inlet and a water discharge line connected to the drum at the filtered water outlet. The unfiltered water is received from the water supply line through the unfiltered water inlet and the filtered water is discharged back into the water discharge line through the filtered water outlet. The water circulating line further comprises the water supply line having a water pump located along the water supply line and opposingly connected to a decorative waterway. The decorative waterway comprises a waterway head, water feature terminus or a combination of decorative water features. The water pump used in alternative embodiments of the present invention, may be a submersible or centrifugal water pump.

In an alternative embodiment, the water filtration device further comprises a lid locking means as a means to interactively lock the removable and secure lid on the drum top.

In an alternative embodiment, the filtered water outlet comprising the top fitting, the water by-pass valve, the by-pass pipe, and the dumping point. The decorative waterway further comprises at least one of: a combination of decorative water features and the water feature terminus incorporating the water pump having a pump power source and a pump connection connecting the water pump to the water supply line.

An alternative embodiment of the present invention is a method for re-circulating filtered water in a decorative waterway, said method comprising a water filtration device containing replaceable water filter media. The unfiltered water inlet is configured to allow unfiltered water to enter the drum through the unfiltered water inlet. The filtered water outlet is configured to allow filtered water to exit the drum through the filter water outlet. The decorative waterway comprises a water circulating line connecting to the drum. The water circulating line comprises a water supply line connected to the drum at the unfiltered water inlet whereby the unfiltered water is received from the water supply line through the unfiltered water inlet and the filtered water is discharged back into the water discharge line through the filtered water outlet. The water circulating line provides the water supply line with the water pump, located along the water supply line. The decorative waterway comprises a waterway head, a water feature terminus and at least one decorative water feature or a combination of decorative water features. Power to the water pump is provided from the pump power source for pumping and circulating the unfiltered water into the water filtration device, creating the filtered water, and for pumping and circulating the filtered water into the water discharge line through the filtered water outlet to the at least one decorative water feature thereby re-circulating the unfiltered water as filtered water from the water filtration device back through the at least one decorative water feature to the water feature terminus.

As unfiltered water is pumped from the water feature terminus, it passes through the replaceable water filter media that fills the removable canister. The particles or debris contained within the unfiltered water are trapped in the replaceable water filter media and the clean or filtered water passes out the filtered water outlet and the water by-pass valve to the waterway head.

To service the replaceable water filter media, the water pump is turned off and the removable and secure lid is removed. The removable canister is inverted so that the replaceable water media, slide out of the removable canister. The replaceable water media can then be cleaned and replaced into the removable canister. The removable canister is returned to the drum and the secure lid is secured in place. The water by-pass valve is opened when the water pump, such as the submersible water pump, is turned back on, to clear any unfiltered water remaining in the removable canister. The following are examples of the advantages and problems solved by the present invention:

1. The problem of: unsightly, suspended particles making water appearing muddy or murky; is solved by: capturing debris by passing the unfiltered or pond water through a series of filtration media pads, as replaceable water filter media, which are assembled in a removable canister.
2. The problem of: concealing the water filtration device or apparatus so it is completely out of sight but easily accessed for regular maintenance; is solved by: the self contained and single purpose design of the water filtration device that can be installed anywhere between the water pump and the decorative waterway, at the head of the waterfall or stream.
3. The problem of: having to remove the filtration media one piece at a time directly from the filter "box"; is solved by: a filter canister, the removable canister, inside a filter drum that is easily accessed and removed. The removable canister allows the replaceable water filter media to be simply dumped out, sprayed clean with pressurized water and returned to the canister and to the filter drum.

The present invention has further aspects which are also improvements over known devices including: a. concealability, b. drastically easier service, c. more versatility, and d. ability to be retrofitted to most existing decorative waterway features.

The present invention has new elements not found in known devices including: a removable and interchangeable cartridge, and reusable water filter media.

The aforementioned features, objectives, aspects and advantages of the present invention, and further objectives and advantages of the invention, will become apparent from a consideration of the drawings and ensuing description.

BRIEF DESCRIPTION OF THE SEVERAL
VIEWS OF THE DRAWINGS

The foregoing features and other aspects of the present invention are explained and other features and objects of the present invention will become apparent in the following detailed descriptions, taken in conjunction with the accompanying drawings. However, the drawings are provided for purposes of illustration only, and are not intended as a definition of the limits of the invention.

FIG. 1. illustrates a pictorial representation; an in part perspective view, in part elevational view and in part cross sectional view of the elements of a water filtration device and decorative waterway in one embodiment of the present invention. Depicted in elevated view are cross sections of a generalized view of a water filtration device, a submersible water pump and a water feature terminus, pond or lagoon. The unfiltered water and filtered water are depicted, respectively in their flow directions by arrows, as also shown in FIGS. 1, 5, 7, 8, and 9. Horizontal, uneven lines in the water feature terminus, the cross-sectional pond as depicted, represents unfiltered water. A combination of water features (ponds and waterfalls) are depicted in a perspective view within a rock formation (shown by a single line overlapping the waterway), also characterized as an earthen, elevated mount or hill. Horizontal, uneven lines in the perspective views of the ponds of the combination of water features represent filtered water, as do the vertical lines to the waterfall water features of the decorative waterway, which are all elements of one embodiment.

FIG. 2 illustrates an elevational view of one embodiment of the present invention, depicting a removable canister to the water filtration device containing a replaceable filter media and a pair of lifting handles/media stops in a locked position, as in FIGS. 3, 6, and 7. The location of Cross Section 1-1 is shown in FIG. 8. The replaceable filter media is depicted in FIGS. 2, 3, 6, 7, and 9 in a stippling pattern within the removable canister.

FIG. 3 illustrates an elevational, cross-sectional view of one embodiment of the present invention, depicting a drum containing the removable canister. The location of Cross Section 1-1 is shown in FIG. 8. The cross hatching depicts elements in cross-sectional view, and the stippling represents the replaceable filter media in cross-sectional view. The unfiltered water and filtered water are depicted, respectively in their flow directions by arrows, as also shown in FIGS. 1, 5, 7, 8, and 9. A lid locking means is depicted in two elements: a lid locking side shown as an outline, within the lid and an opposing drum locking side as an opposing, complementing and cooperative element shown as a solid dark feature at the opposing drum top, also shown in FIG. 7.

FIG. 4 illustrates an elevational perspective partial view of one embodiment of the present invention, depicting one of the pair of lifting handles/media stops, an element of the water filtration device. The dark circles represent a pair of pivot points in FIGS. 2, 3, 4, 6, 7, and 9. The dark circles aligning with the pair of lifting handles represent their location on the pair of lifting handles/media stops.

FIG. 5 illustrates a top planar view of one embodiment of the present invention, depicting the pair of lifting handles/media stops overlaying the removable canister, and an interior perforated floor to the removable canister. The dark circles depict the perforations (or holes) to the interior perforated floor.

FIG. 6 illustrates an elevational, cross-sectional view of one embodiment of the present invention, depicting the removable canister to the water filtration device containing the replaceable filter media, and the pair of lifting handles/media stops in a handle locked position. The location of Cross Section 1-1 is shown in FIG. 8. The direction of pivot or movement to lock or unlock the pair of lifting handles/media stops is shown by the arc arrows labeled B, and A or B in FIGS. 6, 7, and 9.

Figure 6:
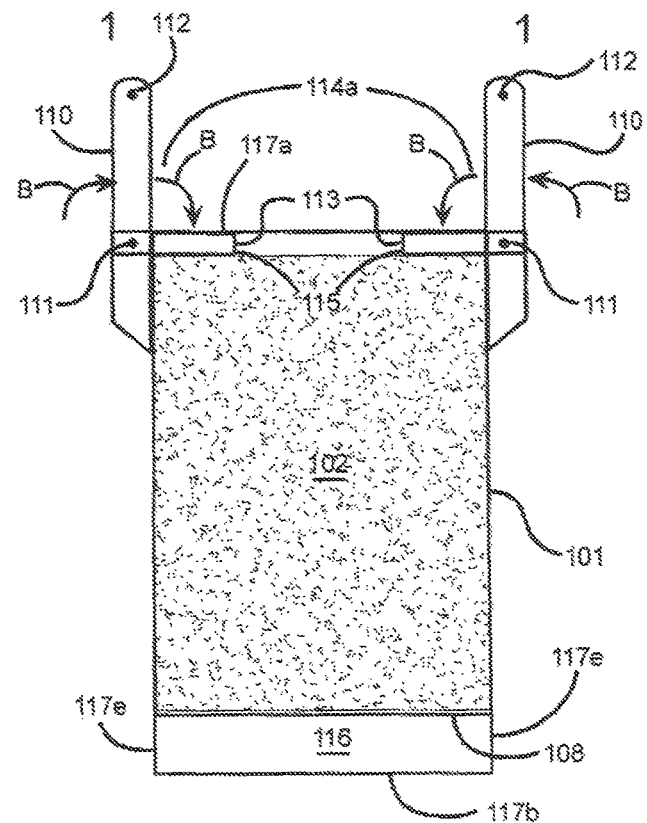
Figure 7:
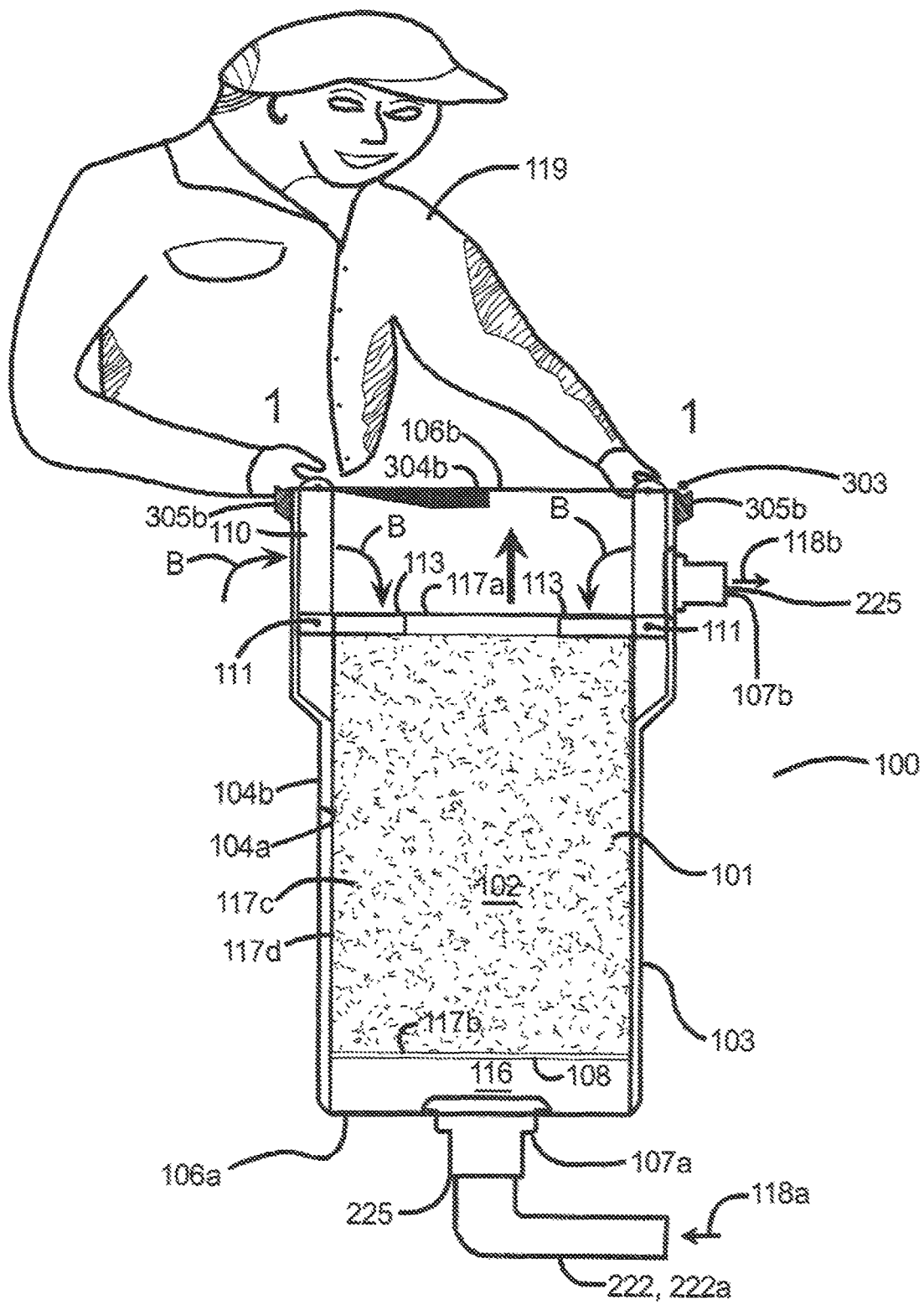
FIG. 7 illustrates an elevational, partial cross-section and partial perspective view of one embodiment of the present invention, depicting the water filtration device in cross-section. A user or operator is depicted in perspective view.
Figure 9:
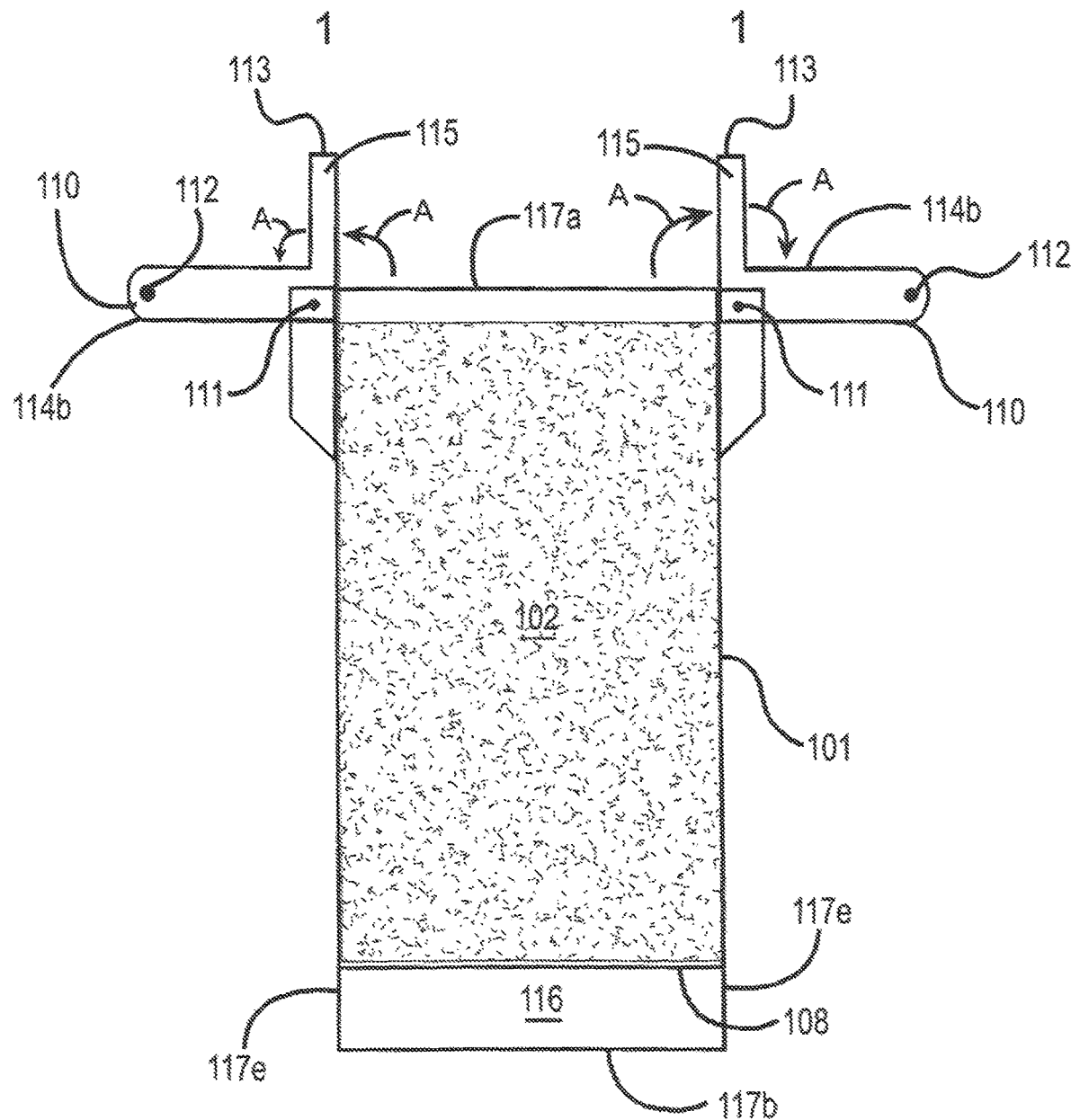

FIG. 9 illustrates an elevational, cross-section view of one embodiment of the present invention, depicting a removable canister to the water filtration device containing a replaceable filter media and a pair of lifting handles/media stops in a handle unlocked position, as in FIGS. 3, 6, and 7. The location of Cross Section 1-1 is shown in FIG. 7. The replaceable filter media is depicted in FIGS. 2, 3, 6, 7, and 9 in a stippling pattern within the removable canister. The pair of lifting handles/media stops are depicted in an unlocked position, their pivot direction noted as A.

Figure 10B:
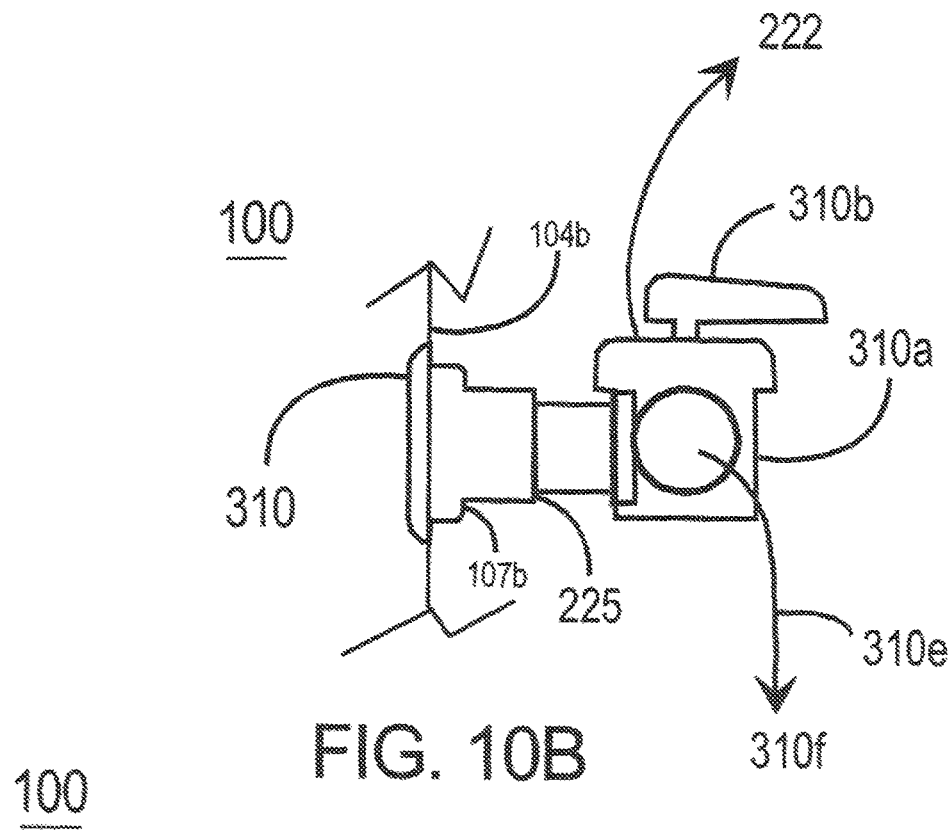
Figure 10A:
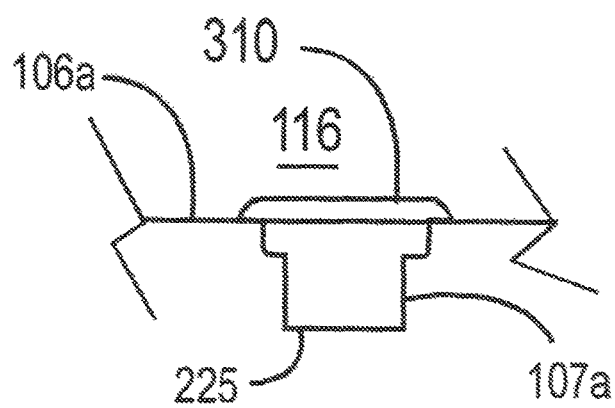

FIGS. 10A and B illustrate additional, partial elevational, and cross sectional views, respectively of an unfiltered water inlet and a filtered water outlet, or bulkhead fittings, both as positioned in FIG. 3 as connected to the drum, in embodiments of the present invention. The jagged lines represent the rest of the omitted portions of the water filtration device.

FIG. 10A illustrates the unfiltered water inlet.

FIG. 10B illustrates the filtered water outlet, having a water by-pass valve. The arrows depict flow of filtered water in the water circulating line and unfiltered water to the dumping point.

DETAILED DESCRIPTION OF THE INVENTION

The present invention will now be described more fully hereinafter with references to the accompanying drawings, in which the preferred embodiment of the invention is shown. This invention, however, may be embodied in different forms, and should not be construed as limited to the embodiments set forth herein. Rather, the illustrative embodiments are provided so that this disclosure will be thorough and complete, and will fully convey the scope of the invention to those skilled in the art. It should be noted, and will be appreciated, that numerous variations may be made within the scope of this invention without departing from the principle of this invention and without sacrificing its chief advantages. Like numbers refer to like elements throughout.

Figure 5:
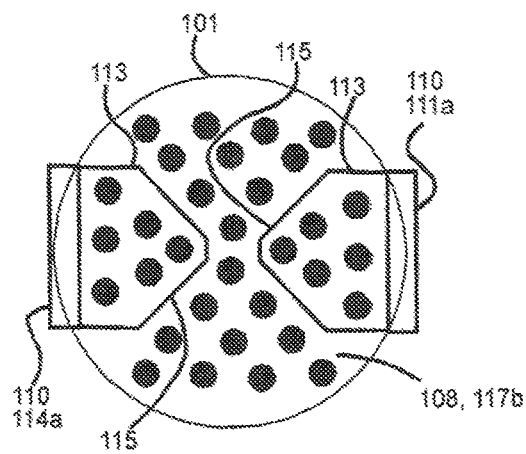

Turning now in detail to the drawings in accordance with the present invention, one embodiment of the present invention, depicted in FIGS. 1, 3, 7, and 8, is a water filtration device 100 comprising a removable canister 101 containing replaceable water filter media 102, and a drum 103 configurably and freely housing the removable canister 101. The drum 103 comprises an interior side 104a and an opposing exterior side 104b, a drum bottom 106a and an opposing drum top 106b. An unfiltered water inlet 107a extends through and into the drum 103 proximal to the drum bottom 106a. A filtered water outlet 107b extends through and out of the drum 103 proximal to the opposing drum top 106b. The removable canister 101 comprises a canister top 117a and an opposing canister bottom 117b, a canister interior side 117c and an opposing canister exterior side 117d. The opposing canister bottom 117b comprises an interior perforated floor 108 (which is also depicted in FIG. 5) disposed proximal to the opposing drum bottom 106a and above the unfiltered water inlet 107a when the removable canister 101 is configurably housed within the drum 103. Replaceable water filter media 102 is housed or contained within the removable canister 101, as shown by the stippled pattern in FIGS. 2, 3, 6, 7, and 9. The removable canister 101 is configured to snugly receive the replaceable water filter media 102, and the drum 103 is configured to snugly receive the removable canister 101. The replaceable water filter media 102 comprises at least one of: spun fiber filtration mats, charcoal bags, biological filtration media, bio balls, or other filtering materials. The mats or bags are also known in the industry as pads.

The filtering materials, constituting the replaceable water filter media 102, in embodiments of the present invention, depicted in FIGS. 2, 3, and 6-9, is understood here to be porous material in which water passes through, thereby removing debris, particles and other impurities from unfiltered water 118a. The term 'filter media' means in the present invention any material that allows water to pass through while capturing entrained particles. It includes other products, other filtering materials comprised as replaceable water filter media 102, used for the remediation of water clarity and water quality issues.

Figure 1:
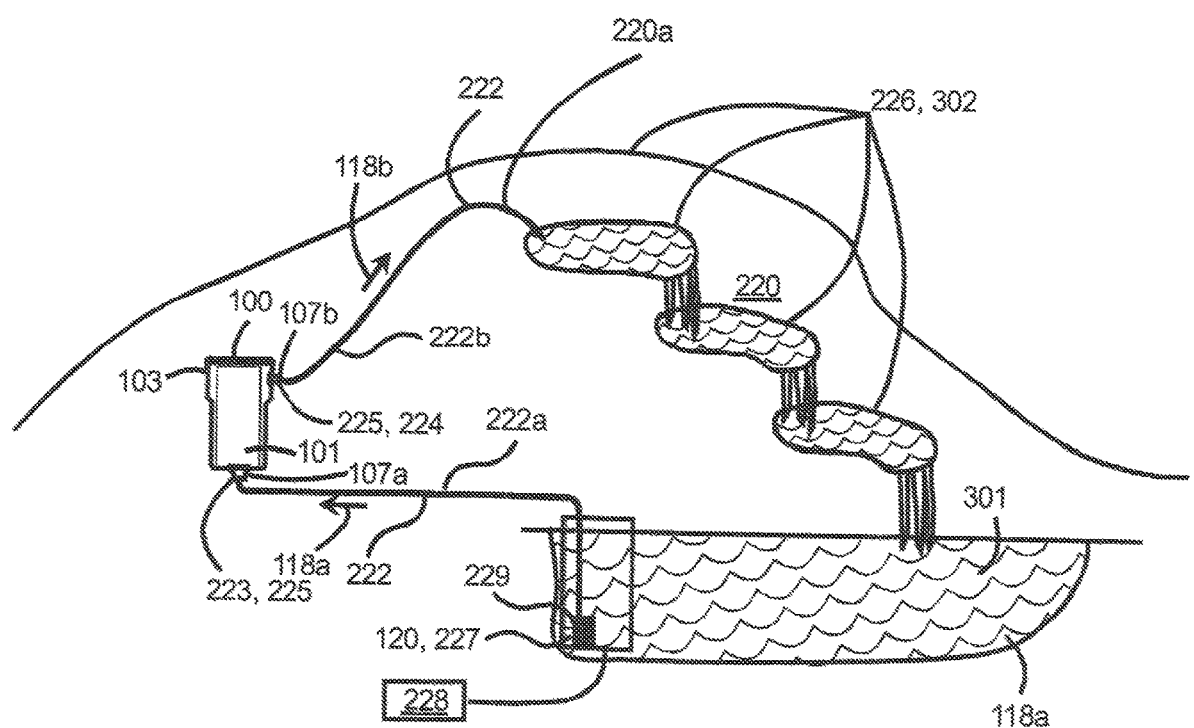
Figure 4:
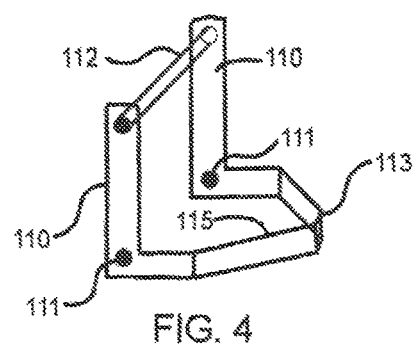

The unfiltered water inlet 107a and the filtered water outlet 107b, shown in FIGS. 1, 3, and 10A and B, are known in the industry as a pair of bulkhead fittings 310. The filtered water inlet 107b, in an alternative embodiment of the present invention, as shown in FIG. 10 B, further comprises a water by-pass valve 310a, a top fitting 310b, a seal 310c, and a securing clamp style ring 310d.

In this embodiment of the present invention, the drum 103, shown in FIGS. 1, 2, 3, 7, and 8, further comprises an inlet connection 223 connected externally to the unfiltered water inlet 107a, and an outlet connection 224 connected externally to the filtered water outlet 107b, with each of the inlet connection 223 and the outlet connection 224 having one of a plurality of attaching means 225 to enable inlet connection 223 and the outlet connection 224 to connect, respectively to a water circulating line 222. The removable canister 101 also includes a canister skirt 117e (shown in FIGS. 3 and 6) concurrent with and extending the canister interior side 117c and the opposing exterior side 117d below the opposing canister bottom 117b vertically to the drum bottom 106a. Described here as being "concurrent", the canister skirt 118e continues the canister interior side 117c and the canister exterior side 117d to the drum bottom 106a. The drum 103 also includes an open region 116 within the drum 103 between the interior perforated floor 108 and the drum bottom 106a; and a removable and secure lid 109 cooperatively fitting on the drum 103 at the opposing drum top 106b. The unfiltered water inlet 107a is configured to allow unfiltered water 118a to enter the drum 103 through the unfiltered water inlet 107a. The filtered water outlet 107b is configured to allow filtered water 118b to exit the drum 103 through the filtered water outlet 107b. In the present invention, the filtered water 118b is understood to be water which has been run through the replaceable water filter media 102, to remove debris and other matter before entering into use in some water feature, such as a decorative waterway 220, as described herein. Water from any water source, such as a water feature terminus 301 described herein and pumped into the water filtration device 100 is deemed to be unfiltered water 118a. Unfiltered water 118a may be augmented by other outside water in the water feature terminus 301. Thus, the filtered water 118b is water ultimately circulated in the system and re-filtered by the replaceable water filter media 102. The open region 116 is understood here to be a void or space within the drum 103, as located herein below the opposing canister bottom 117b, wherein the unfiltered water 118a accumulates to be filtered. The canister skirt 117e serves to prevent the unfiltered water 118a from rising up the drum 103 outside of the removable canister 101.

Figure 8:
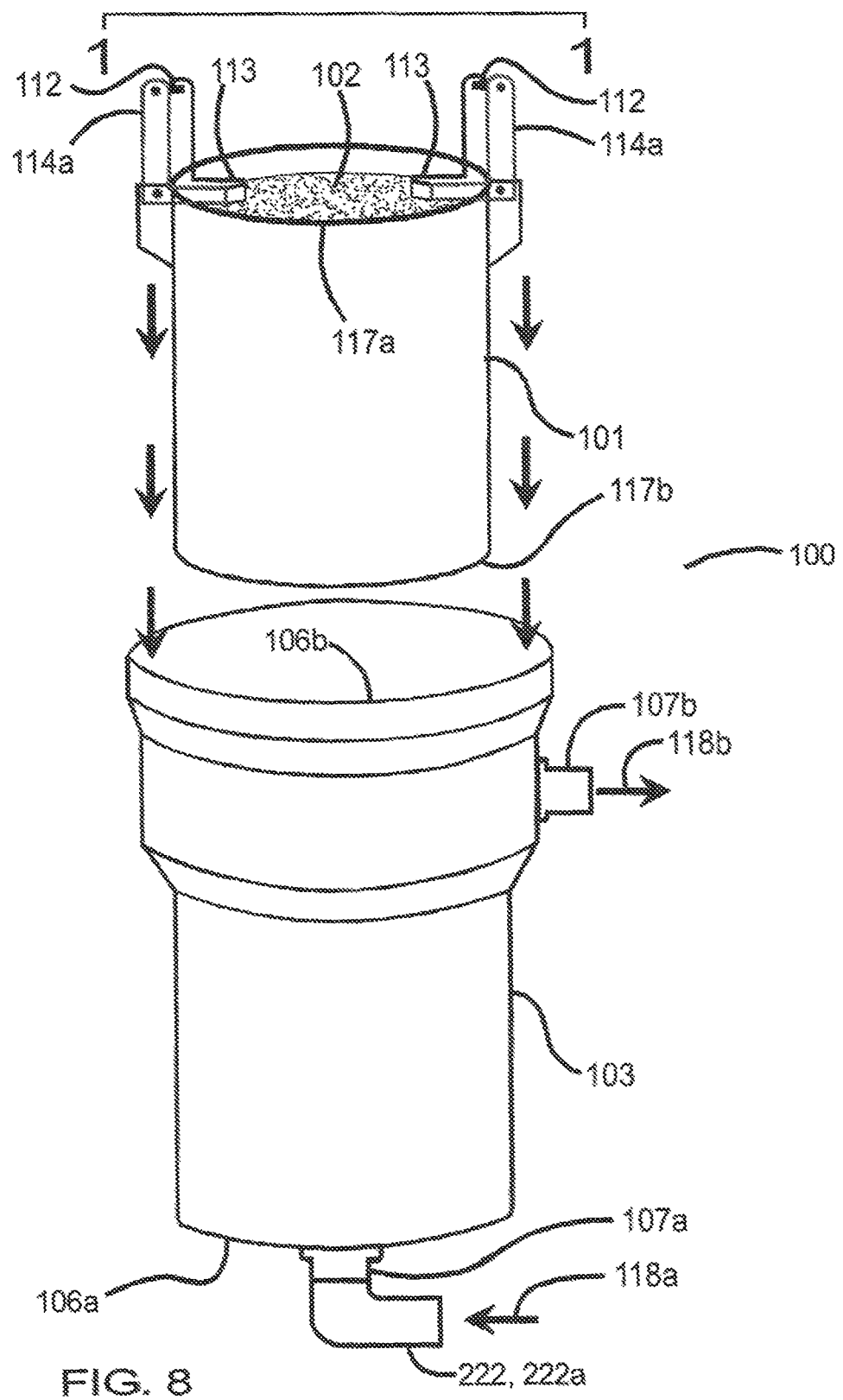
FIG. 8 illustrates a perspective view of one embodiment of the present invention, depicting the removable canister as it fits (per the directional arrows) within the drum, and the location of Cross Section 1-1, to FIGS. 2, 3, 6, 7, and 9.

The water filtration device 100, shown in FIGS. 1, 3 and 8, in alternative embodiments of the present invention provides tubular removable canisters 101 and drums 103. The removable canister 101 is configured to snugly receive the replaceable water filter media 102, and the drum 103 is configured to snugly receive the removable canister 101.

The removable canister 101 and the drum 103, depicted in FIGS. 1-3 and 6-8, are resiliently hard plastic, in an alternative embodiment of the present invention. The water filtration device 100 in an alternative embodiment of the present invention is characterized in the industry as an in-line filtration system that utilizes a plastic barrel (the drum 103) containing a metal (or other resilient material) removable canister 101 filled with various combinations of types of replaceable water filter media 102, the water filtration media, to trap and capture suspended debris or particles in unfiltered water 118a of decorative landscape water gardens/ponds herein, the decorative waterways 220.

In this embodiment of the present invention, a pair of lifting handle/media stops 110 shown in FIGS. 2-4 and 6-7, are each, respectively hingedly and opposedly connected to the opposing canister exterior side 117d by a pair of opposing pivot points 111 located proximal to the canister top 117a. The opposing pivot points 111 operate to hingedly secure the pair of lifting handle/media stops 110 to the removable canister 101. The pair of lifting handle/media stops 110 are elements which engage in locking positions in the water filtration device 100 to secure the replaceable water filter media 102. Each of the pair of lifting handle/media stops 110, respectively further comprise one of a pair of lifting handles 112 and a cooperating filter media stop 113, the cooperating filter media stop 113 having a generally arced shape 115 and attaching perpendicularly to the lifting handle 112 at the opposing pair of pivot points 111, and having the generally arced shape 115 opposite and distal to each of the respective opposing pair of pivot points 111. The pair of lifting handle/media stops 110 have a handle locked position 114a (shown in FIGS. 6 and 7) and a handle unlocked position 114b (shown in FIG. 9), at the canister top 117a operating to secure and release the replaceable water filter media 102. Each of the pair of lifting handles 112 to the pair of lifting handle/media stops 110 extend upward, respectively from the pair of opposing pivot points 111 when the pair of lifting handle/media stops 110 are in the handle locked position 114a, and above the canister top 117a enabling a user 119 to lift the removable canister 101 from the drum 103 when the removable and secure lid 109 is removed from the drum 103. Each of the pair of lifting handles 112 to the pair of lifting handle/media stops 110 hinge downward along the opposing exterior side 104b of the drum 103 when in the handle unlocked position 114b (FIG. 9), allowing the cooperating filter media stop 113 to pivot outward from the removable canister 101, and allowing the user 119 to remove the replaceable water filter media 102 from the removable canister 101. Each of the pair of lifting handles 112 to the pair of lifting handle/media stops 110 re-extend upward, respectively from the opposing pair of pivot points 111 when the pair of lifting handle/media stops 110 are returned to the handle locked position 114a; whereby the user 119 operating the water filtration device 100 replaces the replaceable water filter media 102 into the removable canister 101 while the pair of lifting handle/media stops 110 are in the handle unlocked position 114b, and pivot the pair of lifting handle/media stops 110 into the handle locked position 114a and reinsert the removable canister 101 into the drum 103.

The removable canister 101 in one embodiment of the present invention consists of the interior perforated floor 108, a floor with perforations (shown in FIG. 5) punched or drilled holes on one end, on the opposing canister bottom 117b, and the pair of lifting handles 112 attached to the pair of lifting handles/media stops 110 on the canister top 117b. The barrel, or the drum 103 in the present invention, has an inlet in the center of its bottom, the unfiltered water inlet 107a centrally located within and through the drum bottom 106a, and an outlet on the side, the opposing exterior side 104b, a few inches or proximal from the top of the barrel, the opposing drum top 106b, which is the filtered water outlet 107b (as depicted in FIG. 3). The unfiltered water outlet 107b and the filtered water inlet 107a in alternative embodiments (the pair of bulkhead fittings 310 shown in FIGS. 10A and B) may comprise 2" threaded PVC bulkhead fittings (standard for the industry), and a top fitting 310b in the filtered water inlet 107a (shown in FIG. 10B). In alternative embodiments a water by-pass valve 310a shown in FIG. 10B is installed at the filtered water outlet 107b, whereby the filtered water 118b discharge point, the filtered water outlet 107b, allows any of the unfiltered water 118a remaining in the removable canister 101 to be discharged through a by-pass pipe 310e connected to the water by-pass valve 310a to some convenient point, termed the dumping point 310f.

The drum 103, in this embodiment of the present invention, shown in FIG. 1, is interconnectively and cooperatively located along the water circulating line 222 comprising a water supply line 222a externally and securely connected to the drum 103 at the unfiltered water inlet 107a by an inlet connection 223, and a water discharge line 222b externally and securely connected to the drum 103 at the filtered water outlet 107b by an outlet connection 224. In this manner, the unfiltered water 118a is received from the water supply line 222a through one of the pair of bulkhead fittings 310, the unfiltered water inlet 107a; and the filtered water 118b is discharged back into the water discharge line 222b through the filtered water outlet 107b, the other one of the pair of bulkhead fittings, as also depicted in FIGS. 3 and 10A and B. The water circulating line 222 further comprises the water supply line 222a having a water pump 120 being interconnectively and cooperatively located along the water supply line 222a to and distal to the drum 103 and opposingly connected to a decorative waterway 220. The decorative waterway 220 comprises a waterway head 220a, water feature terminus 301 or a combination of decorative water features 302. The pair of bulkhead fittings 310, the filtered water outlet 117b and the unfiltered water inlet 117a, are respectively, connectively configured to attach to the water circulating line 222 at the respective inlet connection 223 and outlet connection 224 by a plurality of attaching means 225. The attaching means 225 may be any number of pipe fitting attaching means known in the industry, including industry pipe threaded ends, locking ends, pressured wedging ends, or other attaching means. The water pump 120 shown in the embodiment in FIG. 1 is a submersible water pump 227. The water pump 120 is any number of commercial water pumps commonly known and used in the industry. The water pump 120, such as electrical water pumps, used in alternative embodiments of the present invention, may be a submersible or centrifugal water pump. The water feature terminus 301 is defined herein to be the elevational low point of the decorative waterway 220, constituting a pond, lagoon, impoundment, or other attachment basin for the filtered water 118b.

In alternative embodiments, pipe with the parameters: 2"/100 psi polyethylene (poly) pipe, a standard in the industry, is used as the water supply line 222a (shown in FIG. 1). The water supply line 222a is attached from the water pump 120 to a bottom fitting or a pump connection 229. The water discharge line 22b is installed from the water by-pass valve 310a (shown in FIG. 10B) and routed to the waterway head 220a, which is the top of the decorative waterway 220, which may be a waterfall or stream in alternative embodiments. A smaller poly pipe, a by-pass pipe 310e, in an alternative embodiment, shown in FIG. 10B, is installed in the "waste side" (location of the unfiltered water 118a remaining in this system immediately after servicing, replacing the replaceable water filter media 120) of the water by-pass valve 310a and routed to a dumping point 310f in the decorative waterway 220 deemed to be a location convenient for disposing of this unfiltered water 118a.

In an alternative embodiment of the present invention, the water filtration device further comprises, as shown in FIG. 3, a lid locking means 304, wherein the removable and secure lid 109 and the drum top 106a have, respectively a lid locking side 304a and an opposing drum locking side 304b, which cooperatively configure as the lid locking means 304, as a means to interactively lock the removable and secure lid 109 on the drum top 106b. The lid locking means 304 in alternative embodiments may be a twist and lock catch, a combination of cooperating threaded elements, a pressure securing set of elements or other pair of locking means known in the industry encompassing the lid locking side 304a and the opposing drum locking side 304b. A sealing junction 305 shown in FIG. 3 comprises an O ring gasket 303, located and seated within both an accommodating O ring retainer top side 305a rimming the removable and secure lid 109, and an accommodating opposing O ring retainer bottom side 305b rimming the opposing drum top 106b. The sealing junction 305 is the point where the O ring retainer top side 305a and the opposing O ring retainer bottom side 305b meet, respectively against the O ring gasket 303.

In an alternative embodiment of the present invention as shown in FIGS. 10A and B, the unfiltered water inlet 117a and the filtered water outlet 117b, comprise the pair of bulkhead fittings 310 with, the filtered water outlet 117b comprising the top fitting 310b, the water by-pass valve 310a, the by-pass pipe 310e, and the dumping point 310f.

The water filtration device 100, further comprises, as shown in FIG. 1, in alternative embodiments, the decorative waterway 220 which further comprises at least one of: a combination of decorative water features 302 and the water feature terminus 301 incorporating the water pump 120 having a pump power source 228 and a pump connection 229 connecting the water pump 120 to the water supply line 222a. The water circulating line 222 comprises one of a tubing, a trough, or other water circulating conveyance. The pump power source 228 is understood to be any source commonly used in the industry to power the water pump 120.

An alternative embodiment of the present invention, shown in FIGS. 1-10A and B, is a method for re-circulating filtered water 118b in a decorative waterway 220, which has become unfiltered water 118a, said method comprising a water filtration device 100 which has a drum 103 configurably and freely housing a removable canister 101 containing replaceable water filter media 102; the drum 103 comprising an interior side 104a and an opposing exterior side 104b, a drum bottom 106a and an opposing drum top 106b, and a pair of bulkhead fittings 310. The pair of bulkhead fittings 310 comprise: an unfiltered water inlet 107a extending through and into the drum 103 proximal to the drum bottom 106a, and a filtered water outlet 107b extending through and out of the drum 103 proximal to the opposing drum top 106b and having a water by-pass valve 310a. This method embodiment further provides the removable canister 101 having a canister top 117a and an opposing canister bottom 117b, a canister interior side 117c and an opposing canister exterior side 117d, a canister skirt 117e concurrent with and extending the canister interior side 117c and the opposing canister exterior side 117d below the opposing canister bottom 117b vertically to the drum bottom 106a. This method further provides the opposing canister bottom 117b comprising: an interior perforated floor 108 disposed proximal to the drum bottom 106a and above the unfiltered water inlet 107a when the removable canister 101 is housed within the drum 103, creating an open region 116 within the drum 103 between the interior perforated floor 108 and the drum bottom 106a. The opposing drum top 106b is capped with a removable and secure lid 109.

The method embodiment of the present invention, as shown in FIGS. 2-4, 6-7, and 9, hingedly and opposingly connects each of a pair of lifting handle/media stops 110, respectively to the opposing canister exterior side 117d by a pair of opposing pivot points 111 located proximal to the canister top 117a; providing each of the pair of lifting handle/media stops 110, respectively with one of a pair of lifting handles 112 and a cooperating filter media stop 113. The cooperating filter media stop 113 has a generally arched shape 115 attaching perpendicularly to the lifting handle 112 at the opposing pair of pivot points 111 and has the generally arched shape 115 located opposite and distal to the respective, opposing pair of pivot points 111. This method provides each of the pair of lifting handle/media stops 110 with a handle locked position 114a and a handle unlocked position 114b at the canister top 117b (as shown in FIGS. 6 and 9), operating to secure and release the replaceable water filter media 102. Each of the pair of lifting handles 112 to the pair of lifting handle/media stops 110 are extended upward, respectively from the opposing pair of pivot points 111 when the pair of lifting handle/media stops 110 are in the handle locked position 114a, and above the canister top 117a, enabling a user 119 (as shown in FIGS. 7 and 8) to lift the removable canister 101 from the drum 103 when the removable and secure lid 109 is removed from the drum 103. Each of the pair of lifting handles 112 to the pair of lifting handle/media stops 110 is hinged downward along the opposing exterior side 104b of the drum 103 when in the handle unlocked position 114b allowing the cooperating filter media stop 113 to be pivoted outward from the removable canister 101, permitting the user 119 to remove the replaceable water filter media 102 from the removable canister 101, and allowing the user 115 to replace the replaceable water filter media 102, once cleaned, into the removable canister 101 while the pair of handle/media stops 110 are in the handle unlocked position 114b. The pair of handle/media stops 110 may then be pivoted into the handle locked position 114a and the removable canister 101 re-inserted into the drum 103. Each of the pair of lifting handles 112 to the pair of handle/media stops 110 are re-extended upward, respectively from the pair of pivot points 111 when the pair of lifting handle/media stops 110 are returned to the handle locked position 114a and the replaceable filter media 102 is, again, supported within the removable canister 101 by the interior perforated floor 108.

The unfiltered water inlet 107a in this method embodiment of the present invention (shown in FIGS. 1, 3, and 10A-B) is configured to allow unfiltered water 118a to enter the drum 103 through the unfiltered water inlet 107a. The filtered water outlet 107b is configured to allow filtered water 118b to exit the drum 103 through the filtered water outlet 107b. The decorative waterway 220 is provided comprising a water circulating line 222 interconnectively and cooperatively connecting to the drum 103. The water circulating line 222 comprises a water supply line 222a externally connected to the drum 103 at the unfiltered water inlet 107a by an inlet connection 223, and a water discharge line 222b externally connected to the drum 103 at the filtered water outlet 107b by an outlet connection 224 (shown in FIG. 1), whereby the unfiltered water 118a is received from the water supply line 222a through the unfiltered water inlet 107a and the filtered water 118b is discharged back into the water discharge line 222b through the filtered water outlet 107b. The water circulating line 222 provides the water supply line 222a with the water pump 120, shown here as a submersible water pump 227, being interconnectively and cooperatively located along the water supply line 222a to and distal to the drum 103 and opposingly to the decorative waterway 220. The decorative waterway 220 comprises a waterway head 220a, a water feature terminus 301 and at least one decorative water feature 226 or a combination of decorative water features 302. The at least one decorative water feature 226 terminates at the water feature terminus 301.

This method embodiment of the present invention provides the drum 103, shown in FIGS. 1-3, 7, and 8, with an inlet connection 223 connected externally at the unfiltered water inlet 107a to the water supply line 222a and an outlet connection 224 connected externally at the filtered water outlet 107b to the water discharge line 222b. Each of the inlet connection 223 and the outlet connection 224 have one of a plurality of attaching means 225. The water pump 120, shown herein as a submersible water pump 227, comprises a pump power source 208 and a pump connection 229; circulating and delivering filtered water 118b from the water filtration device 100 into the water discharge line 222b, to the at least one decorative water feature 226 and ultimately to the water feature terminus 301 by gravity and/or the pumping activity. The water pump 120, such as the submersible water pump 227, is installed and incorporated within the water feature terminus 301, pumping and delivering the unfiltered water 118a from the water feature terminus 301 through the water supply line 222a into the open region 116 of the drum 103 through the unfiltered water inlet 107a at the inlet connection 223; pumping the unfiltered water 118a in the open region 116 up through the interior perforated floor 108 into the replaceable filter media 102 of the removable canister 101. The replaceable filter media 102 (as shown in FIG. 6) filters the unfiltered water 118a through the replaceable filter media 102 creating the filtered water 118b. The filtered water 118b exits due to the pumping through the filtered water outlet 107b and into the water discharge line 222b at the outlet connection 224. Power to the water pump 120 is provided from the pump power source 228 for pumping and circulating the unfiltered water 118b into the water filtration device 100, creating the filtered water 118a, and for pumping and circulating the filtered water 118a into the water discharge line 222b through the filtered water outlet 107b to the at least one decorative water feature 226 thereby re-circulating the unfiltered water 118a as the filtered water 118a from the water filtration device 100 back through the at least one decorative water feature 226 to the water feature terminus 301.

In an alternative method embodiment of the present invention, the water filtration device 100 further comprises a lid locking means 304, comprising a lid locking side 304a and an opposing drum locking side 304b; wherein the removable and secure lid 109 and the drum top 106a have, respectively the lid locking side 304a and the opposing drum locking side 304b cooperatively configured as the lid locking means 304, a means to interactively lock the removable and secure the lid 109 on the drum top 106b; and a sealing junction 305, comprising: an O ring gasket 303 seating and locating within an accommodating O ring retainer top side 305a rimming the removable and secure lid 109, and an accommodating opposing O ring retainer bottom side 305b rimming the opposing drum top 106b. The O ring gasket 303 in one embodiment is a rubber seal to provide a nonporous, flexible secure boundary, commonly known and used in the industry. The sealing junction 305, in alternative embodiments, may have other forms of elastic seals known in the industry.

Alternatively, in this method embodiment of the present invention for re-circulating the filtered water 118b in the decorative waterway 220, the at least one decorative water feature 226 comprises at least one of: a stream, one or more ponds, rock formations, one or more waterfalls, or a combination of decorative water features 302.

Alternatively, in this method embodiment of the present invention for re-circulating the filtered water 118b in the decorative waterway 220, the removable canister 101 and the drum 103 are tubular, as shown in FIG. 8.

Alternatively, in this method embodiment of the present invention for re-circulating the filtered water 118b in a decorative waterway 220, the removable canister 101 is configured to snugly receive the replaceable water filter media 102, and the drum 103 is configured to snugly receive the removable canister 101, as shown in FIGS. 1-9.

Alternatively, in this method embodiment of the present invention for re-circulating the filtered water 118b in the decorative waterway 220, the removable canister 101 and the drum 103 comprise resiliently hard plastic.

As unfiltered water 118a is pumped from the water feature terminus 301, as shown in FIG. 1 (such as a pond, lagoon, water catchment, or other water impoundment), it passes through the replaceable water filter media 102 that fills the removable cannister 101. The particles or debris contained within the unfiltered water 118a are trapped in the replaceable water filter media 102, and the clean or filtered water 118b passes out the filtered water outlet 107b, and the water by-pass valve 310a, to the head of the waterfall or stream herein, the waterway head 220a.

Alternatively, to this method embodiment of the present invention for re-circulating the filtered water 118b in the decorative waterway 220, the replaceable water filter media 102 (shown in FIGS. 2, 3, 6 and 7) comprise at least one of: spun fiber filtration mats, charcoal bags, biological filtration media, bio balls, or other filtering materials. To service the replaceable water filter media 102, shown in FIGS. 2, 3, 6, and 7, the water pump 120 is turned off and the barrel lid, herein the removable and secure lid 109, is removed. The removable canister 101 is inverted so that the dirty filter pads, constituting the replaceable water media 102, which alternatively in some embodiments are in the form of pads, slide out of the removable canister 101. The replaceable water media 102 can then be sprayed off with a garden hose and otherwise cleaned and replaced into the removable canister 101. The removable canister 101 is returned to the drum 103, and the removable and secure lid 109 is secured in place. The water by-pass valve 310a shown in FIG. 10 B is opened when the water pump 120, such as the submersible water pump 227, is turned back on, to clear any unfiltered water 117a remaining in the removable canister 101. The water by-pass valve 310a is reset to a closed, operational position.

Alternatively, in this method embodiment of the present invention for re-circulating the filtered water 118b in the decorative waterway 220, the pump power source 228 depicted in FIG. 1 comprises one of: gasoline, utility electricity, or battery.

Alternatively, in this method embodiment of the present invention for re-circulating the filtered water 118b in the decorative waterway 220, the water filtration device 100 further comprises, as shown in FIG. 3, a lid locking means 304, wherein the removable and secure lid 109 and the drum top 106a have, respectively a lid locking side 304a and an opposing drum locking side 304b which are cooperatively configured as the lid locking means 304 as a means to interactively lock the removable and secure lid 109 on the drum top 106b, as described above. A sealing junction 305 for sealing the drum 103 and comprising an O ring gasket 303 is seated, both within an accommodating O ring retainer top side 305a rimming the removable and secure lid 109 and an accommodating opposing O ring retainer bottom side 305b rimming the opposing drum top 106b.

Alternatively, in the method embodiment of the present invention for re-circulating the filtered water 118b in the decorative waterway 220 shown in FIG. 1, the water circulating line 222 comprises one of: a tubing, a trough, or other water circulating conveyance.

The following are examples of the advantages and problems solved by the present invention (depicted in FIG. 1):

1. The problem of: unsightly, suspended particles making water 118b appearing muddy or murky; is solved by: capturing debris by passing the unfiltered water 118a or pond water through a series of filtration media pads, as the replaceable water filter media 102, which are assembled in the removable canister 101.
2. The problem of: concealing the water filtration device 100 or apparatus so it is completely out of sight but easily accessed for regular maintenance; is solved by: the self contained and single purpose design of the water filtration device 100 that can be installed anywhere between the water pump 120 (such as a submersible water pump 227 or a centrifugal water pump) and the decorative waterway 220, at the waterway head 220a of the waterfall or stream.
3. The problem of: having to remove the filtration media, herein the replaceable water filter media 102, one piece at a time directly from the filter "box", or the removable canister 101; is solved by: a filter canister, the removable canister 101, inside a filter drum the drum 103, that is easily accessed and removed. The removable canister 101 allows the replaceable water filter media 102 to be simply dumped out, sprayed clean with pressurized water and returned to the removable canister 101 and to the drum 103.

The present invention has further aspects which are also improvements over known devices including: a. concealability, b. drastically easier servicing, c. more versatility, and d. ability to be retrofitted to any at least one decorative water feature 226, a number of which features are depicted generally by FIG. 1, and e. replaceability, either having the replaceable water filter media 102 cleaned and placed back in the removable canister 101, or replacing the used replaceable water filter media 101 with a new replaceable water media filter 101.

Another advantage of the present invention is that it efficiently and effectively removes unsightly debris from the unfiltered water 118a in decorative ponds and water gardens, in the decorative waterway 220, shown in FIG. 1.

The present invention has new elements not found in known devices including: a removable and inter-changeable cartridge, described herein as the replaceable water filter media 102, shown in FIGS. 2, 3, 6, and 7. Unique features of the present invention regarding the replaceable water filter media 102 further include the ability to use readily available filtration products that come in a 'mat' form and are woven to different densities. The removable canister 101 feature of the present invention may be filled with any manufacturers' filter mats and other filtering materials in any combination that best serves the goal of removing particulate matter as the unfiltered water 118a flowing through them. This allows for the filtration of ponds and other at least one decorative water features 206, depicted in FIG. 1, with a variety of water clarity problems and provides great flexibility for customizing the replaceable water filter media 102 contents to fit each situation. The removable canister 101 also can be fitted with carbon pellets and other filtering materials as replaceable water filter media 102 for balancing the water ph, removing ammonia, nitrates or other problem causing constituents in the unfiltered water 118a. These filtering materials can be customized for seasonal needs, as well.

Another advantage of the present invention is that the water filtration device 108 can be installed anywhere in-line on the water circulating line 222, shown in FIG. 1, allowing for easy and convenient service, while at the same time being concealed from view, thus increasing the natural appearance of any at least one decorative water feature 226.

Another advantage of the present invention is that an extra removable canister 101, shown in FIGS. 2, 3, 6, and 7, can be filled with the replaceable water filter media 102 and kept on hand. It then takes the user 119 a short time, all of 5 minutes, to change the removable canister 101. The removable canister 101 so removed, may be rinsed and readied for use at an owner's convenience.

The aforementioned features, objectives, aspects and advantages of the present invention, and further objectives and advantages of the invention, will become apparent from a consideration of the drawings and ensuing description.

Having thus described in detail a preferred selection of embodiments of the present invention, it is to be appreciated, and will be apparent to those skilled in the art, that many physical changes could be made in the device without altering the invention, or the concepts and principles embodied therein. Unless otherwise specifically stated, the terms and expressions have been used herein as terms of description and not terms of limitation, and are not intended to exclude any equivalents of features shown and described or portions thereof. Various changes can, of course, be made to the preferred embodiment without departing from the spirit and scope of the present invention. The present invention apparatus, therefore, should not be restricted, except in the following claims and their equivalents.

Although specific advantages have been enumerated above, various embodiments may include some, none, or all of the enumerated advantages.

Other technical advantages may become readily apparent to one of ordinary skill in the art after review of the following figures and description.

It should be understood at the outset that, although exemplary embodiments are illustrated in the figures and described herein, the principles of the present disclosure may be implemented using any number of techniques, whether currently known or not. The present disclosure should in no way be limited to the exemplary implementations and techniques illustrated in the drawings and described herein.

Unless otherwise specifically noted, articles depicted in the drawings are not necessarily drawn to scale.

Modifications, additions, or omissions may be made to the systems, devices, apparatuses, and methods described herein without departing from the scope of the disclosure. For example, the components of the systems, devices, methods and apparatuses may be integrated or separated. Moreover, the operations of the systems, devices, methods and apparatuses disclosed herein may be performed by more, fewer, or other components and the devices, apparatuses, and methods described may include more, fewer, or other steps. Additionally, steps may be performed thereto in any suitable order. As used in this document, "each" refers to each member of a set or each member of a subset of a set.

To aid the Patent Office and any readers of any patent issued on this application in interpreting the claims appended hereto, applicant wishes to note that he does not intend any of the appended claims or claim elements to invoke 35 U.S.C. 112(f) unless the words "means for" or "step for" are explicitly used in the particular claim.

I claim:

1. A water filtration device, said device comprising:
   a. a removable canister containing replaceable water filter media;
   b. a drum configurably and freely housing the removable canister;
   c. the drum comprising: an interior side and an opposing exterior side, a drum bottom and an opposing drum top, and a pair of bulkhead fittings comprising: an unfiltered water inlet located centrally within and extending through the drum bottom and into the drum, and a filtered water outlet extending through and out of the drum proximal to the opposing drum top;
   d. the removable canister comprising: a canister top and an opposing canister bottom, a canister interior side and an opposing canister exterior side, the opposing canister bottom comprising: an interior perforated floor disposed proximal to the opposing drum bottom and above the unfiltered water inlet when the removable canister is configurably housed within the drum;
   e. the drum further comprising: an inlet connection connected externally to the unfiltered water inlet, and an outlet connection connected externally to the filtered water outlet with each of the inlet connection and the outlet connection having one of a plurality of attaching means;
   f. the removable canister further comprising: a canister skirt concurrent with and extending the canister interior side and the opposing exterior side below the opposing canister bottom vertically to the drum bottom;
   g. an open region within the drum between the interior perforated floor and the drum bottom;
   h. a removable and secure lid cooperatively fitting on the drum at the opposing drum top;
   i. the unfiltered water inlet configured to allow unfiltered water to enter the drum through the unfiltered water inlet;
   j. the filtered water outlet configured to allow filtered water to exit the drum through the filtered water outlet;
   k. a pair of lifting handle/media stops, each, respectively hingedly and opposedly connected to the opposing canister exterior side by a pair of opposing pivot points located proximal to the canister top;
   l. the pair of lifting handle/media stops, each, respectively further comprising: one of a pair of lifting handles and a cooperating filter media stop, the cooperating filter media stop having a generally arced shape and attaching perpendicularly to the lifting handle at the opposing pair of pivot points and having the generally arced shape opposite and distal to each of the respective opposing pair of pivot points;
   m. the pair of lifting handle/media stops having a handle locked position and a handle unlocked position at the canister top and operating to secure and release the replaceable water filter media;
   n. each of the pair of lifting handles to the pair of lifting handle/media stops extending upward, respectively from the pair of opposing pivot points when the pair of lifting handle/media stops are in the handle locked position, and above the canister top enabling a user to lift the removable canister from the drum when the removable and secure lid is removed from the drum;
   o. each of the pair of lifting handles to the pair of lifting handle/media stops hinging downward along the opposing exterior side of the drum when in the handle unlocked position, allowing the cooperating filter media stop to pivot outward from the removable canister, and allowing the user to remove the replaceable water filter media from the removable canister;

p. each of the pair of lifting handles to the pair of lifting handle/media stops re-extending upward, respectively from the opposing pair of pivot points when the pair of lifting handle/media stops are returned to the handle locked position; and q. whereby the user operating the water filtration device replacing the replaceable water filter media into the removable canister while the pair of lifting handle/media stops are in the handle unlocked position, and pivoting the pair of lifting handle/media stops into the handle locked position and reinserting the removable canister into the drum.

2. The water filtration device of claim 1, wherein the removable canister and the drum are tubular, the removable canister being configured to snugly receive the replaceable water filter media, and the drum being configured to snugly receive the removable canister.

3. The water filtration device of claim 1 further comprising: the drum interconnectively and cooperatively locating along a water circulating line, the water circulating line comprising: a water supply line externally and securely connected to the drum at the unfiltered water inlet by an inlet connection and a water discharge line externally and securely connected to the drum at the filtered water outlet by an outlet connection, whereby the unfiltered water is received from the water supply line through the unfiltered water inlet and the filtered water is discharged back into the water discharge line through the filtered water outlet.

4. The water circulating line of claim 3 further comprising: the water supply line having a water pump being interconnectively and cooperatively located along the water supply line to and distal to the drum and opposingly to a decorative waterway, the decorative waterway comprising: a waterway head, a water feature terminus, and at least one decorative water feature, and the water pump comprising one of: a submersible water pump or a centrifugal water pump.

5. The water filtration device of claim 4, further comprising:
a. the decorative waterway;
b. the decorative waterway further comprising at least one of: a combination of decorative water features, and the water feature terminus incorporating the water pump; and
c. the water pump having a pump power source and a pump connection connecting the water pump to the water supply line.

6. The water filtration device of claim 3, wherein the filtered water outlet and the unfiltered water inlet are respectively, connectively configured to attach to the water circulating line at the respective outlet connection and the inlet connection by a plurality of attaching means.

7. The water filtration device of claim 3, wherein the water circulating line comprising one of: a tubing, a trough, or other water circulating conveyance.

8. The water filtration device of claim 1, wherein the removable canister and the drum are resiliently hard plastic.

9. The water filtration device of claim 1, wherein the replaceable water filter media comprising at least one of: spun fiber filtration mats, charcoal bags, biological filtration media, bio balls, or other filtering materials.

10. The water filtration device of claim 1, further comprising:
a. a lid locking means, comprising: a lid locking side and an opposing drum locking side;
b. wherein the removable and secure lid and the drum top have, respectively the lid locking side and the opposing drum locking side cooperatively configured as the lid locking means to interactively lock the removable and secure lid on the drum top; and
c. a sealing junction, comprising: an O ring gasket seating within an accommodating O ring retainer top side rimming the removable and secure lid and an accommodating opposing O ring retainer bottom side rimming the opposing drum top.

11. The water filtration device of claim 1, wherein the filtered water outlet comprising: a top fitting and a water by-pass valve connecting to a by-pass pipe, and a dumping point.

12. A method for re-circulating filtered water in a decorative waterway, said method comprising:
a. providing a water filtration device, comprising:
i. having a drum configurably and freely housing a removable canister containing replaceable water filter media;
ii. providing the drum comprising: an interior side and an opposing exterior side, a drum bottom and an opposing drum top, and a pair of bulkhead fittings comprising: an unfiltered water inlet located centrally within and extending through the drum bottom and into the drum, and a filtered water outlet extending through and out of the drum proximal to the opposing drum top and having a water by-pass valve;
iii. further providing the removable canister comprising: a canister top and an opposing canister bottom, a canister interior side and an opposing canister exterior side, a canister skirt concurrent with and extending the canister interior side and the opposing canister exterior side below the opposing canister bottom vertically to the drum bottom;
iv. further providing the opposing canister bottom comprising: an interior perforated floor disposed proximal to the drum bottom and above the unfiltered water inlet when the removable canister is housed within the drum;
v. creating an open region within the drum between the interior perforated floor and the drum bottom;
vi. capping the opposing drum top with a removable and secure lid;
vii. hingedly and opposingly connecting a pair of lifting handle/media stops, each, respectively to the opposing canister exterior side by a pair of opposing pivot points located proximal to the canister top;
viii. providing the pair of lifting handle/media stops, each, respectively with one of a pair of lifting handles and a cooperating filter media stop, the cooperating filter media stop having a generally arched shape attaching perpendicularly to the lifting handle at the opposing pair of pivot points and having the generally arched shape opposite and distal to the respective, opposing pair of pivot points;
ix. providing each of the pair of lifting handle/media stops with a handle locked position and a handle unlocked position at the canister top, operating to secure and release the replaceable water filter media;
x. extending each of the pair of lifting handles to the pair of lifting handle/media stops upward, respectively from the opposing pair of pivot points when the pair of lifting handle/media stops are in the handle locked position, and above the canister top enabling a user to lift the removable canister from the drum when the removable and secure lid is removed from the drum;

xi. hinging each of the pair of lifting handles to the pair of lifting handle/media stops downward along the opposing exterior side of the drum when in the handle unlocked position allowing the cooperating filter media stop to be pivoted outward from the removable canister allowing the user to remove the replaceable water filter media from the removable canister;

xii. allowing the user to replace the replaceable water filter media once cleaned into the removable canister while the pair of handle/media stops are in the handle unlocked position, pivoting the pair of handle/media stops into the handle locked position and re-inserting the removable canister into the drum; and xiii. re-extending each of the pair of lifting handles to the pair of handle/media stops upward, respectively from the pair of pivot points when the pair of lifting handle/media stops are returned to the handle locked position;

b. supporting the replaceable filter media within the removable canister by the interior perforated floor;

c. configuring the unfiltered water inlet to allow unfiltered water to enter the drum through the unfiltered water inlet;

d. configuring the filtered water outlet to allow filtered water to exit the drum through the filtered water outlet;

e. providing the decorative waterway comprising: a water circulating line interconnectively and cooperatively connecting to the drum, the water circulating line comprising: a water supply line externally and securely connected to the drum at the unfiltered water inlet by an inlet connection, and a water discharge line externally and securely connected to the drum at the filtered water outlet by an outlet connection, whereby the unfiltered water is received from the water supply line through the unfiltered water inlet and the filtered water is discharged back into the water discharge line through the filtered water outlet;

f. further providing the water circulating line with the water supply line having a water pump being interconnectively and cooperatively located along the water supply line to and distal to the drum and opposingly to a decorative waterway, the decorative waterway further comprising: a waterway head, a water feature terminus and at least one decorative water feature;

g. terminating the at least one decorative water feature at the water feature terminus;

h. providing the drum with an inlet connection connected externally at the unfiltered water inlet to the water supply line and an outlet connection connected externally at the filtered water outlet to the water discharge line, with each of the inlet connection and the outlet connection having one of a plurality of attaching means;

i. providing the water pump comprising: a pump power source and a pump connection;

j. circulating and delivering filtered water from the water filtration device into the water discharge line and to the at least one decorative water feature and ultimately to the water feature terminus by gravity;

k. installing and incorporating the water pump within the water feature terminus, pumping and delivering the unfiltered water from the water feature terminus through the water supply line into the open region of the drum through the unfiltered water inlet at the inlet connection;

l. pumping the unfiltered water in the open region up through the interior perforated floor into the replaceable filter media of the removable canister;

m. filtering the unfiltered water through the replaceable filter media creating the filtered water, and exiting the filtered water through the filtered water outlet and into the water discharge line at the outlet connection;

n. providing power to the water pump from the pump power source for pumping and circulating the unfiltered water into the water filtration device, creating the filtered water, and pumping and circulating the filtered water into the water discharge line through the filtered water outlet to the at least one decorative water feature; and o. thereby re-circulating the unfiltered water as the filtered water from the water filtration device back through the at least one decorative water feature to the water feature terminus.

13. The method for re-circulating the filtered water in the decorative waterway of claim 12, wherein the removable canister and the drum are tubular.

14. The method for re-circulating the filtered water in a decorative waterway of claim 12, further comprising: configuring the removable canister to snugly receive the replaceable water filter media, and configuring the drum to snugly receive the removable canister.

15. The method for re-circulating the filtered water in the decorative waterway of claim 12, wherein the removable canister and the drum comprising: resiliently hard plastic.

16. The method for re-circulating the filtered water in the decorative waterway of claim 12, the at least one decorative water feature comprising at least one of: a stream, one or more ponds, a rock formation, one or more waterfalls, or a combination of decorative water features.

17. The method for re-circulating the filtered water in the decorative waterway of claim 12, wherein the replaceable water filter media comprising at least one of: spun fiber filtration mats, charcoal bags, biological filtration media, bio balls, or other filtering materials.

18. The method for re-circulating the filtered water in the decorative waterway of claim 12, the pump power source comprising one of: gasoline, utility electricity, or battery.

19. The method for re-circulating the filtered water in the decorative waterway of claim 12, wherein the water filtration device further comprising:

a. a lid locking means, wherein the removable and secure lid and the drum top have, respectively a lid locking side and an opposing drum locking side cooperatively configured as the lid locking means to interactively lock the removable and secure lid on the drum top; and b. a sealing junction, comprising: an O ring gasket seating within an accommodating O ring retainer top side a rimming the removable and secure lid and an accommodating opposing O ring retainer bottom side rimming the opposing drum top.

20. The method for re-circulating the filtered water in the decorative waterway of claim 12, wherein the water circulating line comprising one of: a tubing, a trough, or other water circulating conveyance.

* * * * *